Aug. 15, 1939.  J. F. HAYNES  2,169,527
SEED HARVESTER
Filed Nov. 30, 1936   2 Sheets-Sheet 1
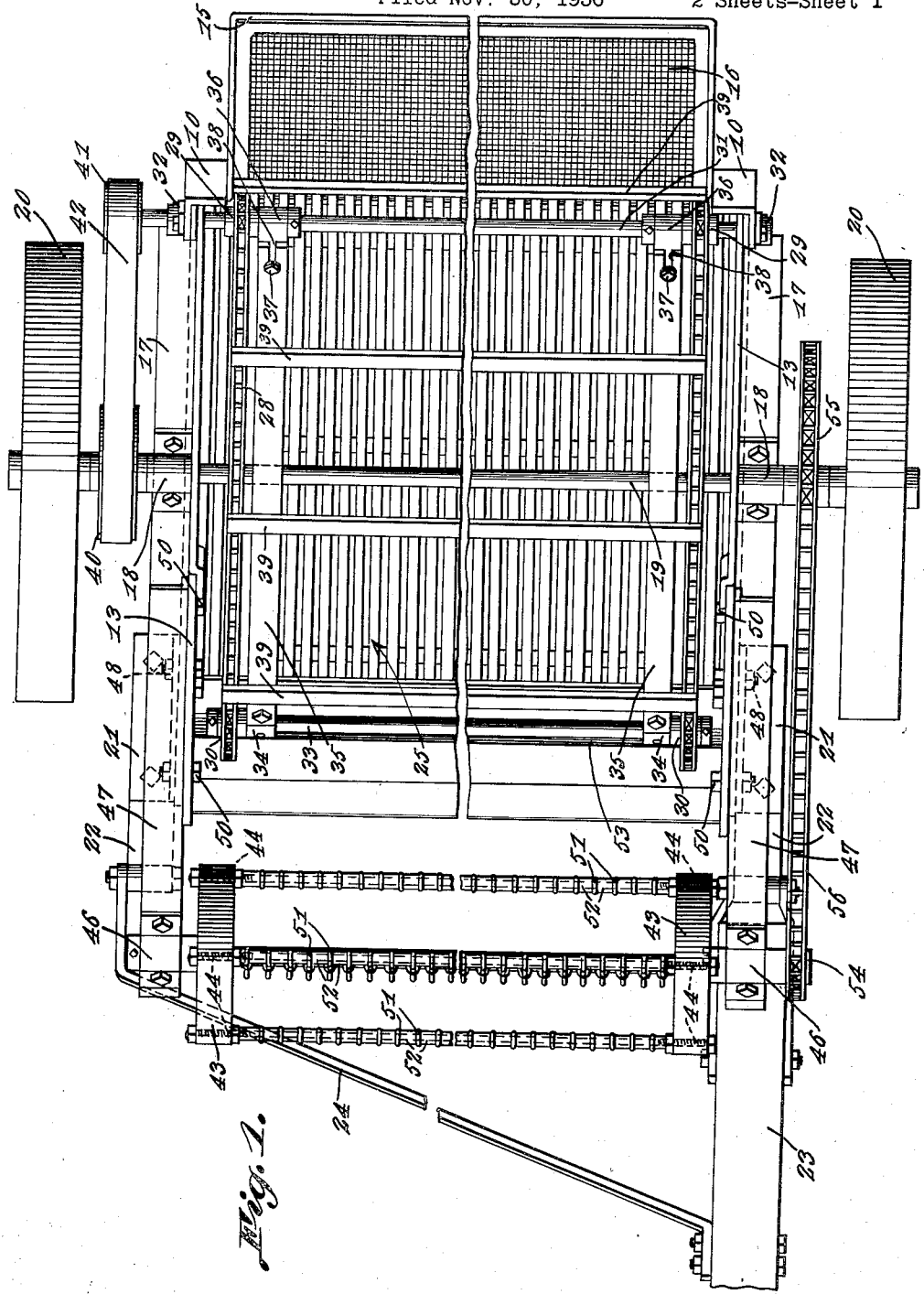
James F. Haynes, INVENTOR
BY *Victor J. Evans & Co.*
ATTORNEYS Aug. 15, 1939.   J. F. HAYNES   2,169,527
SEED HARVESTER
Filed Nov. 30, 1936   2 Sheets-Sheet 2
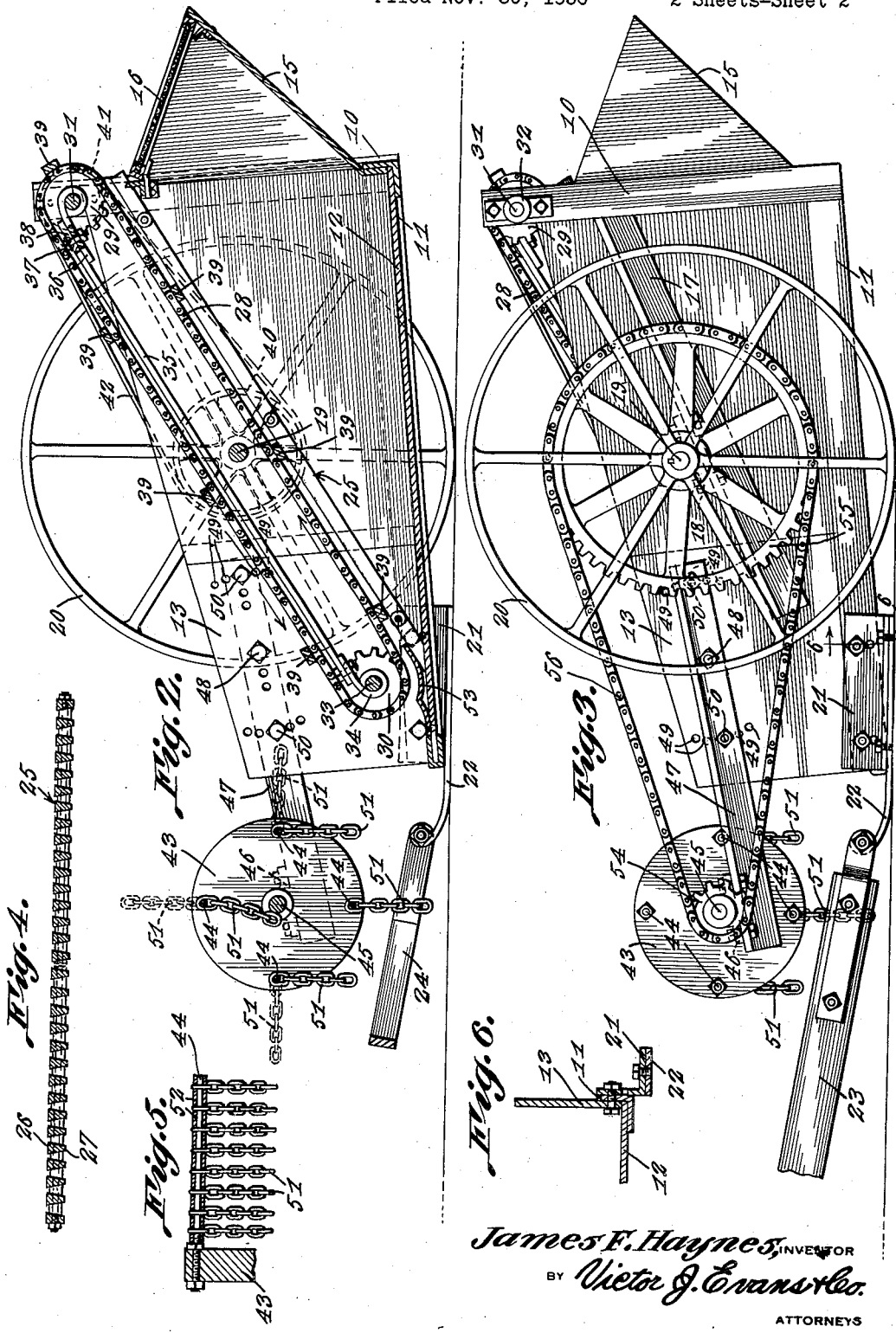
James F. Haynes, INVENTOR
BY Victor J. Evans & Co.
ATTORNEYS

Patented Aug. 15, 1939

2,169,527

UNITED STATES PATENT OFFICE 2,169,527

SEED HARVESTER

James F. Haynes, Murfreesboro, Tenn.

Application November 30, 1936, Serial No. 113,508

1 Claim. (Cl. 56—126)

This invention relates to seed harvesters and has for an object to provide a machine of this character which will harvest clover, lespedeza, and other low plants, the seeds of which are formed close to the ground.

A further object of the invention is to provide a machine of this character having a novel beater drum carrying flexible beater elements such as chains, eye bolts and the like, which are rapidly revolved about the axis of the drum as an axis of rotation and knock the seed rearwardly into the collecting trough of the machine.

A further object is to provide a machine of this type having a novel screen formed of parallel slats having the upper faces wider than the lower faces so that the spaces between the slats are enlarged at the bottom and prevent the seeds sticking in and clogging the spaces between the slats and thus promoting gravitation of the seeds freely into the collection chamber of the machine.

A further object is to provide a machine of this character having the front end provided with runners or shoes which ride upon the ground and dispose the beater drum at the proper height above the ground to most effectively perform its work.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a plan view of a seed harvester constructed in accordance with the invention.

Figure 2 is a longitudinal sectional view of the harvester.

Figure 3 is a side elevation of the harvester.

Figure 4 is a longitudinal sectional view of the slat screen.

Figure 5 is a detail sectional view showing beater chains and their means of attachment to the drum.

Figure 6 is a detail sectional view taken on the line 6—6 of Figure 1 showing one of the shoes and its attachment to the collecting chamber of the harvester.

Referring now to the drawings in which like characters of reference designate similar parts in the various views, the body of the machine is in the form of an open front box preferably formed of metal and comprising rear frame posts 10, longitudinal bottom sills 11, a sheet metal bottom 12, side walls 13 and an inclined rear wall 15, there being a wire mesh screen 16 that slopes downwardly from the rear posts 10 to the top of the rear wall for discharging chaff from the machine and through which seeds gravitate on to the rear wall 15 and into the collecting chamber.

A pair of angle bars 17 are secured to the side walls and to the rear posts and slope downwardly as best shown in Figure 3. These bars are equipped with bearing boxes 18 in which is journaled an axle 19 having fixed thereto ground wheels 20. The body or collecting chamber is thus pivotally supported upon the axle substantially midway between the front and rear ends of the body so that the open front end of the body rides upon the ground and is supported by runners or shoes 21 of angle iron construction. These shoes have bolted thereto links 22 and one of the links carries a draft tongue 23. A brace rod 24 is connected to the other link and to the draft tongue as best shown in Figure 1.

A slat screen designated in general by the numeral 25 is mounted in the body or collecting chamber and slopes downwardly from the point above the wire mesh screen 16 to a point near the front edge of the bottom 12 of the body. The slats of the screen extend longitudinally of the body and as best shown in Figure 4, each slat is provided with a wide top face 26 and a narrow bottom face 27 so that the spaces between the slats will be larger at the bottom than at the top and thus sticking of the seeds in the spaces will be prevented and free gravitation of the seeds through the spaces will be promoted.

An endless conveyor is mounted on the body above the slat screen and comprises endless sprocket chains 28 which are trained over sprocket gears 29 and 30 carried by an upper shaft 31 journaled in bearings 32 at the upper ends of the rear posts 10, and a lower shaft 33 which is journaled in strap bearings 34 carried at the lower ends of bars 35 which are pivotally secured at the upper ends to the upper shaft 31 by strap bars 36. The upper strap bearings are adjustably secured to the bars 35 by bolts 37 which pass through slots 38 in the bars 35 so that the sprocket chains 28 may be tensioned as desired.

A plurality of cross bars 39 connect the chains together at spaced intervals and these cross bars ride upon the slat screen 25 and yieldably support the endless conveyor on the slat screen.

These cross bars when riding up the slat screen push chaff and seeds ahead of them, the seeds gravitating through the spaces between the slats while the chaff is carried upwardly and discharged on to the wire mesh screen 16 from which it gravitates on to the ground. The endless conveyor is driven by a belt drive comprising a pulley 40 which is fixed to the axle 19, a pulley 41 which is fixed to the upper shaft 31 of the endless conveyor and a belt 42 trained over both pulleys.

Rotatably mounted in front of the body of the machine is a beater drum comprising disc heads 43 which are connected by rods 44 spaced apart an angular distance of 90 degrees apart. The heads are provided with stub shafts 45 which are mounted in bearings 46 carried at the lower ends of angle iron bars 47. These bars are pivoted to the side walls 13 by pivot bolts 48. An arcuate series of openings 49 are formed in the side walls 13 to selectively receive adjusting bolts 50 carried by the bars 47 so that the beater drum may be adjusted vertically to dispose the hereinafter described beating elements close enough to the ground to effectively operate upon various heights of plants.

The beating elements 51 are preferably in the form of a plurality of short chains the upper links of which loosely embrace the rods 44 and are spaced apart by sleeves 52. These chains are thrown out to extend radially by centrifugal force as the drum is rapidly rotated and by virtue of their flexibility are not damaged should they strike irregularities in the ground. The chains knock the seeds rearwardly into a sheet metal collecting trough 53 which is disposed on the bottom of the body directly below the lower shaft 33 of the endless conveyor. The cross bars of the endless conveyor move into the trough which latter is curved in the arc of a circle struck from the lower shaft 33 as a center to accommodate such movement of the cross bars. The cross bars gather the seeds and chaff from the collecting trough and carry the same upwardly along the slat trough as previously described.

Although chains 51 have been illustrated and described as forming the beating elements, other types of beating elements may be used it having been found in practice that eye bolts with their eyes encircling the rods 44, to pivotally attach the same to the rods, may be substituted for the chains and work to good advantage. It is always desirable however, that the beating elements be flexibly attached to the beater drum so as not to be broken when striking rough ground.

The beater drum is driven by a chain drive comprising a small sprocket gear 54 which is fixed to the stub shaft 46 of one of the drum heads, a large sprocket gear 55 which is fixed to the axle 19, and a sprocket chain 56 which is trained over both gears. By virtue of the sprocket gear of the beater drum being of considerably smaller diameter than the driving sprocket gear 55 the beater drum will be revolved at high speed so that several beater elements 51 will successively strike each plant in turn as the machine is moved forward and effectively dislodge all of the seeds from the plant.

Since the operation has been described as the description of the parts progressed, it is thought that the construction and operation of the invention will be fully understood without further explanation.

What is claimed is:

A seed harvester comprising a body open at the front and having vertical side walls and a bottom wall forming a container, an upwardly and rearwardly inclined screen in the body formed of parallel slats extending longitudinally of the body, an endless conveyor in the body having a lower reach riding upwardly upon the screen, means for supporting the open front end of the body above the ground, a seed collecting trough disposed transversely of the bottom of the front end of the body and communicating with the lower end of the conveyor, bars pivoted intermediate their ends to respective sides of the body, a beater drum rotatably mounted on the outer ends of the bars in advance of the body, there being an arcuate series of openings in each side of the body concentric with the pivots of the bars, adjusting bolts passed selectively through the openings and the bars for regulating the height of the drum above the ground, beater chains secured to the drum, and means for rotating the drum to swing the chains in a direction to knock seeds from plants into the collecting trough and on to the conveyor.

JAMES F. HAYNES.